United States Patent
Wolfsteiner

(10) Patent No.: US 12,539,834 B2
(45) Date of Patent: Feb. 3, 2026

(54) ANTI-LOCK BRAKING SYSTEM

(71) Applicant: Hochschule für angewandte Wissenschaften München, Munich (DE)

(72) Inventor: Peter Wolfsteiner, Munich (DE)

(73) Assignee: Hochschule Fur Angewandte Wissenschaften Munchen, Munich (DE)

( * ) Notice: Subject to any disclaimer, the term of this patent is extended or adjusted under 35 U.S.C. 154(b) by 78 days.

(21) Appl. No.: 18/487,305

(22) Filed: Oct. 16, 2023

(65) Prior Publication Data

US 2024/0132030 A1 Apr. 25, 2024
US 2024/0227755 A9 Jul. 11, 2024

(30) Foreign Application Priority Data

Oct. 19, 2022 (EP) .................................. 22202590

(51) Int. Cl.
*B60T 8/1761* (2006.01)
*B60T 8/17* (2006.01)
*B62L 1/00* (2006.01)

(52) U.S. Cl.
CPC ........ *B60T 8/17616* (2013.01); *B60T 8/1706* (2013.01); *B62L 1/005* (2013.01); *B60T 2270/10* (2013.01)

(58) Field of Classification Search
CPC .............. B60T 8/17616; B60T 8/1706; B60T 2270/10; B62L 1/005
USPC .......................................................... 701/78
See application file for complete search history.

(56) References Cited

U.S. PATENT DOCUMENTS

| | | | | | |
|---|---|---|---|---|---|
| 3,522,973 | A | * | 8/1970 | Hans-Christof | B60T 8/172 303/167 |
| 3,626,226 | A | * | 12/1971 | Pauwels | G01P 3/488 984/359 |
| 3,752,272 | A | * | 8/1973 | Ooka | F16D 66/00 60/567 |
| 3,772,549 | A | * | 11/1973 | Cumming | B60T 8/329 310/168 |
| 3,870,911 | A | * | 3/1975 | Toyama | G01P 3/488 310/155 |

(Continued)

FOREIGN PATENT DOCUMENTS

DE 40 10 326 A1 10/1991
DE 10 2018 100 795 B3 3/2019

OTHER PUBLICATIONS

European Search Report dated Mar. 10, 2023, issued in European Application No. 22 202 590.0, filed Oct. 19, 2022.

*Primary Examiner* — Logan M Kraft
*Assistant Examiner* — John D Bailey
(74) *Attorney, Agent, or Firm* — Workman Nydegger

(57) ABSTRACT

Provided is an anti-lock braking system for a vehicle. The anti-lock braking system includes a hub having a hollow cavity which is configured to accommodate an axle, a device having a first part which is substantially static relative to the hub and a second part which may rotate relative to the hub when the first part and the second part are disengaged, and an actuator which is configured to control a transmission of a braking force from a frame of the vehicle to the hub by actuating the device, wherein one of the first part and the second part is configured to extend helically around the axle.

15 Claims, 5 Drawing Sheets

(56) References Cited

U.S. PATENT DOCUMENTS

| | | | | |
|---|---|---|---|---|
| 3,939,373 | A * | 2/1976 | Roberts | B60T 8/329 310/168 |
| 4,664,233 | A * | 5/1987 | Tsuchida | F16D 55/224 303/115.6 |
| 4,673,221 | A * | 6/1987 | Hayashi | B60T 8/74 303/115.6 |
| 4,697,825 | A * | 10/1987 | Hayashi | B60T 8/52 303/115.6 |
| 4,792,194 | A * | 12/1988 | Hayashi | B60T 8/1706 303/115.6 |
| 4,834,221 | A * | 5/1989 | Yoshinori | B60T 8/1706 303/115.6 |
| 5,244,257 | A * | 9/1993 | Muller | B60T 8/1706 188/181 A |
| 5,348,123 | A * | 9/1994 | Takahashi | B60T 13/745 188/162 |
| 5,663,494 | A * | 9/1997 | Clayton, Jr. | G01L 3/22 73/862.17 |
| 6,315,092 | B1 * | 11/2001 | Schwarz | B60T 13/741 188/71.9 |
| 6,371,252 | B1 * | 4/2002 | Kanehisa | F16D 65/12 188/26 |
| 6,626,270 | B2 * | 9/2003 | Drennen | F16D 65/18 188/72.1 |
| 6,854,572 | B2 * | 2/2005 | Usui | F16D 65/567 188/71.7 |
| 6,915,883 | B2 * | 7/2005 | Watanabe | B60T 1/005 188/71.9 |
| 6,959,791 | B2 * | 11/2005 | Usui | F16D 65/567 188/162 |
| 7,209,032 | B2 * | 4/2007 | Fennel | B60C 23/043 340/447 |
| 7,475,950 | B1 * | 1/2009 | Glenn | B60B 3/085 301/64.203 |
| 7,540,571 | B2 * | 6/2009 | Yamaguchi | B60T 1/005 188/71.9 |
| 8,008,817 | B2 * | 8/2011 | Lamperth | H02K 7/14 310/268 |
| 8,091,418 | B2 * | 1/2012 | Acker | B60T 8/171 73/146 |
| 8,588,997 | B2 * | 11/2013 | Pribula | B60Q 1/44 701/72 |
| 8,893,845 | B2 * | 11/2014 | Stilwell | B60T 13/662 180/370 |
| 10,589,738 | B1 * | 3/2020 | Boecker | B60W 30/02 |
| 10,597,008 | B1 * | 3/2020 | Arsenault | B60T 8/17616 |
| 11,214,332 | B2 * | 1/2022 | Lin | B60L 53/12 |
| 11,226,016 | B1 * | 1/2022 | Elias | F16D 41/14 |
| 11,390,355 | B1 * | 7/2022 | Riley | B62L 1/005 |
| 11,697,392 | B2 * | 7/2023 | Lin | B60R 25/04 318/501 |
| 2002/0138189 | A1 * | 9/2002 | Kubik | B60T 17/22 374/E13.01 |
| 2004/0201270 | A1 * | 10/2004 | Suzuki | B60T 13/741 303/20 |
| 2004/0212249 | A1 * | 10/2004 | Yamaguchi | F16D 65/18 303/122.04 |
| 2005/0139432 | A1 * | 6/2005 | Takizawa | F16D 65/123 188/26 |
| 2008/0111342 | A1 * | 5/2008 | Niekerk | B60T 8/171 188/26 |
| 2010/0250082 | A1 * | 9/2010 | King | G01P 3/487 188/18 A |
| 2010/0258372 | A1 * | 10/2010 | Anderson | B60W 30/18127 180/165 |
| 2012/0194331 | A1 * | 8/2012 | Su | B62L 1/10 340/432 |
| 2012/0305345 | A1 * | 12/2012 | Ward | B60T 8/4009 188/72.4 |
| 2013/0162011 | A1 * | 6/2013 | Ruopp | B62L 3/023 303/9.64 |
| 2015/0232075 | A1 * | 8/2015 | Fosdike | B60T 7/20 701/70 |
| 2016/0318575 | A1 * | 11/2016 | Shimoda | B60T 8/3225 |
| 2017/0151829 | A1 * | 6/2017 | Neutsch | B62M 6/40 |
| 2017/0151833 | A1 * | 6/2017 | Neutsch | B60B 1/003 |
| 2017/0341467 | A1 * | 11/2017 | Seear | F16D 55/39 |
| 2017/0341650 | A1 * | 11/2017 | Arai | F02D 41/0002 |
| 2018/0111440 | A1 * | 4/2018 | D'Amato | B60G 17/018 |
| 2018/0170472 | A1 * | 6/2018 | Corno | B62J 45/414 |
| 2018/0201339 | A1 * | 7/2018 | Shahana | B62J 45/423 |
| 2019/0054924 | A1 * | 2/2019 | Ambruzs | B60T 8/1706 |
| 2019/0120305 | A1 * | 4/2019 | Lavezzi | F16D 55/226 |
| 2019/0135033 | A1 * | 5/2019 | Gruber | B60T 1/065 |
| 2019/0225298 | A1 * | 7/2019 | Takahashi | B62J 45/4151 |
| 2020/0010138 | A1 * | 1/2020 | Nishihara | G06N 20/00 |
| 2020/0010144 | A1 * | 1/2020 | Kondo | B62J 45/00 |
| 2020/0017086 | A1 * | 1/2020 | Oshida | B60W 10/06 |
| 2020/0055501 | A1 * | 2/2020 | Corno | B60T 8/58 |
| 2020/0070789 | A1 * | 3/2020 | Oshida | B60W 30/04 |
| 2020/0189536 | A1 * | 6/2020 | Oshida | B60T 8/261 |
| 2020/0298809 | A1 * | 9/2020 | Todeschini | B60T 8/17551 |
| 2020/0307553 | A1 * | 10/2020 | Oshida | B60T 8/17558 |
| 2021/0122227 | A1 * | 4/2021 | Bindl | B60T 13/12 |
| 2021/0269016 | A1 * | 9/2021 | Hattori | B60W 10/188 |
| 2021/0347343 | A1 * | 11/2021 | Wahl | B60T 8/261 |
| 2022/0153377 | A1 * | 5/2022 | Nose | B60W 30/18145 |
| 2022/0161770 | A1 * | 5/2022 | Brinkman | B60T 8/1887 |
| 2022/0281265 | A1 * | 9/2022 | Elkins | B62L 1/005 |
| 2023/0105137 | A1 * | 4/2023 | Tsai | B60T 13/662 303/137 |
| 2024/0042983 | A1 * | 2/2024 | Zhang | G01D 5/04 |

* cited by examiner

ANTI-LOCK BRAKING SYSTEM

CROSS-REFERENCE TO RELATED APPLICATIONS

This application claims priority to European Application No. 22 202 590.0 filed Oct. 19, 2022, which is incorporated herein by specific reference.

BACKGROUND OF THE INVENTION

1. The Field of the Invention

The present disclosure relates to an anti-lock braking system for a vehicle. In particular, the present disclosure relates to an anti-lock braking system for a wheel-based single-track vehicle, such as a bicycle, wherein the anti-lock braking system has a clutch for temporarily disengaging a hub of a wheel of the single-track vehicle and a brake of the single-track vehicle.

2. The Relevant Technology

DE 10 2018 100 795 A1 provides for an anti-lock braking system for a single-track vehicle with a clutch for temporarily disengaging a hub of a wheel of the single-track vehicle from a brake of the single-track vehicle. However, although the anti-lock braking system design shown in DE 10 2018 100 795 A1 works very well over a broad range of usage scenarios, there may be circumstances under which modified versions may yield even superior performance.

SUMMARY OF THE INVENTION

According to a first aspect of the present invention, an anti-lock braking system for a vehicle may comprise a hub with a hollow cavity which is configured to accommodate an axle, a device with a first part that is substantially static relative to the hub and a second part that may rotate relative to the hub when the first part and the second part are disengaged, and an actuator which is configured to control a transmission of a braking force from a frame of the vehicle to the hub by actuating the device, wherein one of the first part and the second part is configured to extend helically around the axle.

In this regard, the term "anti-lock braking system", as used throughout the description and the claims, particularly refers to a braking system which is configured to monitor sensor measurements indicating whether the vehicle is about to lose traction while braking and to temporarily decrease a braking force until traction is restored. Moreover, the term "hub", as used throughout the description and the claims, particularly refers to a component which has an outer surface that is (substantially) axially symmetric to the axle, wherein a tire of a wheel which comprises the hub is connected to the hub by one or more members (e.g., spokes) extending substantially radially outward from the outer surface.

Furthermore, the term "axle", as used throughout the description and the claims, particularly refers to an elongated component to which the hub is connected by a bearing (e.g., a ball bearing). Moreover, the term "actuator", as used throughout the description and the claims, particularly refers to an electric device which allows exerting a force onto an element to position of the element. I.e., the element may move from a first position to a second position when the actuator exerts a force onto the element. The element may return to the first position when the actuator ceases to exert the force onto the element. Furthermore, the term "frame", as used throughout the description and the claims, particularly refers to a rigid structure which provides a support for persons or goods transported by the vehicle. For example, the term "frame", as used throughout the description and the claims, may refer to a frame of a bicycle. In addition, the formulation "actuating the device", as used throughout the description and the claims, particularly refers to causing the first part and the second part to engage or disengage.

The part that extends helically around the axle may provide for superior traction between the hub and the frame when the brake is activated to decelerate the vehicle.

The anti-lock braking system according to the first aspect may further comprise a torsion spring. The torsion spring may be configured to cause the first part and the second part to engage when the actuator is deactivated.

This may reduce the energy consumption of the anti-lock braking system and improve safety. For example, the actuator may only be activated (for relative short amounts of time) when sensor measurements indicate that the vehicle is about to lose traction while braking.

The device may be a band clutch, a wrap spring clutch, etc.

Band clutches and spring clutches allow for safely transmitting high braking forces (torques). In addition, a torque transmitted through a band clutch, or a spring clutch can be accurately controlled using sensors required for establishing the anti-lock braking functionality of the system.

The anti-lock braking system according to the first aspect may further comprise a disc of a disc brake.

A disc brake allows for increasing the maximum braking force while at the same time allowing for accurate manual control of the barking torque.

The first part may be configured to extend helically around the axle and the second part may comprise a cylindrical portion, wherein the disc may be connected to, attached to, or integrally formed with, said cylindrical portion. The anti-lock braking system may further comprise a first element, a second element, and a torsion spring. The torsion spring may be connected to the first part by the first element. The second element may be configured to be movable by the actuator and the second element may cause the first element to rotate relative to the hub around the axle when the second element is moved parallel to a longitudinal axis of the axle. The second element may comprise a magnetic material and the actuator may be configured to generate a magnetic field when activated. The actuator may comprise an electromagnet which is substantially static relative to the axle.

This provides for a fast response time and low wear and tear.

Alternatively, the second part may be configured to extend helically around the axle and the disc may be connected to, attached to, or integrally formed with, said second part. The first part may comprise a cylindrical portion and the second part may be configured to extend helically around the cylindrical portion.

The anti-lock braking system according to the first aspect may further comprise a generator. The generator may comprise a first portion which is substantially static relative to the axle and a second portion which is substantially static relative to the hub. The first portion may have a power output.

This may allow to provide power to all frame-mounted components and thus obviate the need for batteries.

The anti-lock braking system according to the first aspect may further comprise a lighting. The generator may be configured to provide electric energy to power the lighting through the power output.

The anti-lock braking system according to the first aspect may further comprise an inertial measurement unit. The inertial measurement unit may be mounted on the axle. The generator may be configured to provide electric energy to power the inertial measurement unit through the power output.

In this regard, the term "inertial measurement unit", as used throughout the description and the claims, particularly refers to a unit which comprises one or more accelerometers and/or gyroscopes. If the inertial measurement unit comprises more than one accelerometer, the accelerometers might measure acceleration in perpendicular directions (e.g., x-, y-, and z-directions in a Cartesian coordinate system). If the inertial measurement unit comprises more than one gyroscope, the gyroscopes might measure rotational rates around perpendicular axes (e.g., roll, pitch, yaw). Moreover, the formulation that a component is "mounted on the axle", as used throughout the description and the claims, particularly refers to a component which is attached to the axle such that the component remains substantially static relative to the axle.

That the inertial measurement unit remains substantially static relative to the axle may be beneficial in obviating the need for transforming measurements from a hub-centric coordinate system to a frame-centric coordinate system.

The inertial measurement unit may be configured to measure a yaw rate of the vehicle.

The anti-lock braking system according to the first aspect may further comprise an angular rate sensor. The angular rate sensor may be configured to measure an angular rate of the hub. The generator may be configured to provide electric energy to power the angular rate sensor through the power output.

The anti-lock braking system according to the first aspect may further comprise a controller. The controller may be mounted on the axle. The controller may be configured to determine, based on measurements of the inertial measurement unit and/or the angular rate sensor whether the braking force exerted on the hub is to be reduced to prevent the wheel from locking up. The controller may be further configured to cause a reduction in the braking force exerted on the hub by activating the actuator. The controller may comprise a processor and a memory storing instructions which when executed by the processor cause the processor to determine whether the braking force exerted on the hub is to be reduced and to activate the actuator if the braking force exerted on the hub is to be reduced.

The anti-lock braking system according to the first aspect may also be involved in a method which comprises the steps of determining, by the controller, whether the braking force exerted on the hub is to be reduced and activating, by the controller, the actuator if the braking force exerted on the hub is to be reduced.

The anti-lock braking system according to the first aspect may be an anti-lock braking system for a single-track vehicle.

In this regard, the term "single-track vehicle", as used throughout the description and the claims, particularly refers to a vehicle that leaves a single ground track as it moves along a straight line.

According to a second aspect of the present invention, an anti-lock braking system for a vehicle may comprise a hub having a hollow cavity, an axle, wherein the axle extends through the hollow cavity, an inertial measurement unit, wherein the inertial measurement unit is mounted on the axle.

The anti-lock braking system according to the second aspect may further comprise a generator. The generator may comprise a first portion which is substantially static relative to the axle and a second portion which is substantially static relative to the hub. The first portion may have a power output and the generator may be configured to provide electric energy to power the inertial measurement unit through the power output.

The inertial measurement unit may be configured to measure a yaw rate of the vehicle.

The anti-lock braking system according to the second aspect may further comprise an angular rate sensor. The angular rate sensor may be configured to measure an angular rate of the hub. The generator may be configured to provide electric energy to power the angular rate sensor through the power output.

The anti-lock braking system according to the second aspect may further comprise a controller. The controller may be mounted on the axle. The controller may be configured to determine, based on measurements of the inertial measurement unit and/or the angular rate sensor whether a braking force exerted on the hub is to be reduced to prevent the wheel from locking up. The controller may be further configured to reduce the braking force exerted on the hub by activating the actuator. For example, the controller may be configured to reduce the braking force exerted on the hub by activating the actuator if the controller determines, based on measurements of the inertial measurement unit and/or the angular rate sensor, that the braking force exerted on the hub is to be reduced to prevent the wheel from locking up.

The anti-lock braking system according to the second aspect may further comprise a lighting, wherein the generator provides electric energy to power the lighting through the power output. The anti-lock braking system according to the second aspect may be configured to control the lighting to indicate an operation status of the anti-lock braking system. For example, the lighting may be directed backwards and start to flash if the controller determines, based on measurements of the inertial measurement unit and/or the angular rate sensor, that the braking force exerted on the hub is to be reduced to prevent the wheel from locking up. This may serve as a warning sign for the rearwards traffic and allow the rearward traffic to adjust its driving pattern to avoid accidents.

The anti-lock braking system according to the second aspect may further comprise a device which is configured to establish/break a mechanical connection between the hub and a frame of the vehicle when a brake of the vehicle is activated. The device may comprise a first part which is configured to extend helically around the axle and a second part which may rotate relative to the hub when the first part and the second part are disengaged.

The anti-lock braking system according to the second aspect may further comprise a disc of a disc brake, wherein the second part comprises a cylindrical portion and the disc is connected to, attached to, or integrally formed with, said cylindrical portion.

The device may be a band clutch, a wrap spring clutch, etc.

The anti-lock braking system according to the second aspect may further comprise an electric actuator which is configured to control a transmission of a braking force from the frame through the device to the hub by actuating the device.

The anti-lock braking system according to the second aspect may further comprise a torsion spring. The torsion spring may be connected to the first part by a first element and the torsion spring may be configured to cause the first part and the second part to engage when the electric actuator is deactivated.

The anti-lock braking system according to the second aspect may further comprise a second element, wherein the second element is configured to be movable by the electric actuator and wherein the second element causes the first element to rotate relative to the hub around the axle when the second element is moved parallel to a longitudinal axis of the axle.

The second element may comprise a magnetic material and the electric actuator may be configured to generate a magnetic field when activated. For example, the electric actuator may comprise an electromagnet. The electromagnet may be mounted on the axle.

The anti-lock braking system according to the second aspect may be an anti-lock braking system for a single-track vehicle.

BRIEF DESCRIPTION OF THE DRAWINGS

The foregoing aspects and many of the attendant advantages will become more readily appreciated as the same become better understood by reference to the following description of embodiments, when taken in conjunction with the accompanying drawings, wherein like reference numerals refer to like parts throughout the various views, unless otherwise specified.

Notably, the drawings are not necessarily drawn to scale and unless otherwise indicated, they are merely intended to conceptually illustrate the structures and procedures described herein.

DETAILED DESCRIPTION OF THE PREFERRED EMBODIMENTS

Figure 1:
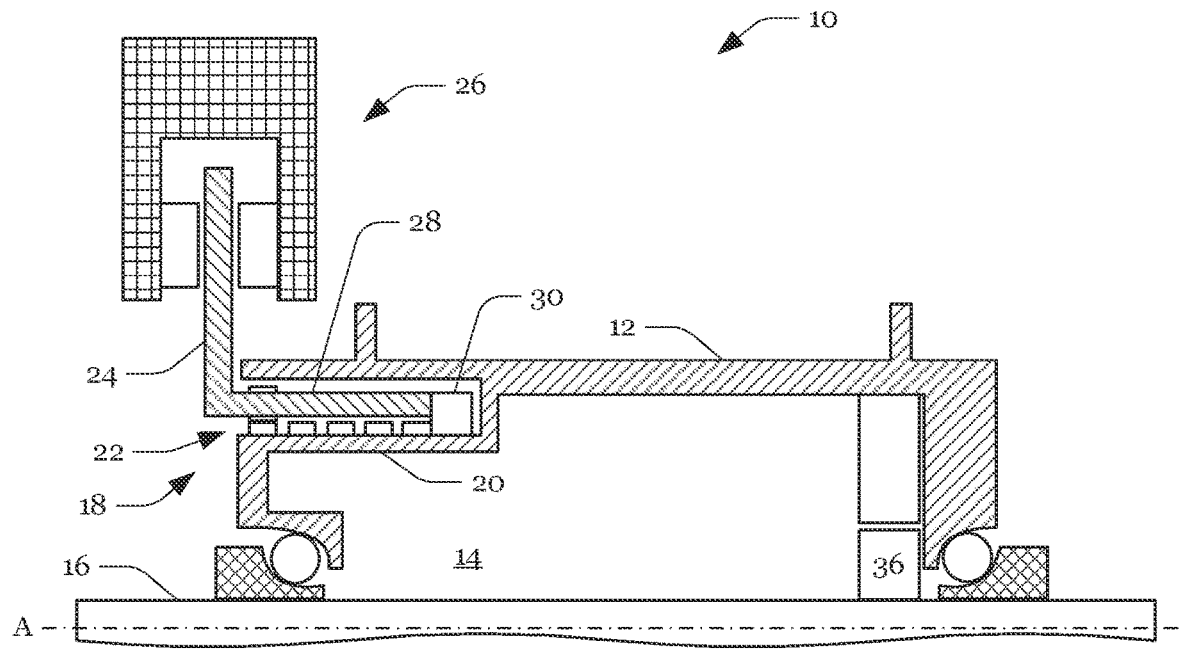
FIG. 1 illustrates an anti-lock braking system for a vehicle according to a first example.

FIG. 1 illustrates anti-lock braking system 10. Anti-lock braking system 10 comprises hub 12 having hollow cavity 14. Hollow cavity 14 accommodates axle 16 to which hub 12 is connected by a ball bearing. Anti-lock braking system 10 further comprises device 18 having first part 20 and second part 22 which form a clutch (e.g., a band clutch, a wrap spring clutch, etc.). First part 20 is integrally formed with hub 12. Second part 22 is connected to disc 24 of disc brake 26 by cylindrical portion 28 and may rotate relative to hub 12 around the longitudinal axis A of axle 16 when first part 20 and second part 22 are disengaged. One side of cylindrical portion 28 dives into a ring-shaped opening in hub 12. Anti-lock braking system 10 further comprises actuator 30. Actuator 30 may control the transmission of the braking force from disc brake 26 (which may be mounted on the frame of the vehicle) to hub 12 by actuating device 18. When actuator 30 actuates device 18, second part 22 which extends helically around axle 16 starts rotating relative to hub 12. This allows for temporarily reducing the braking torque which is exerted by disc brake 26 on a wheel that is connected to hub 12 by spokes or other means.

Figure 2:
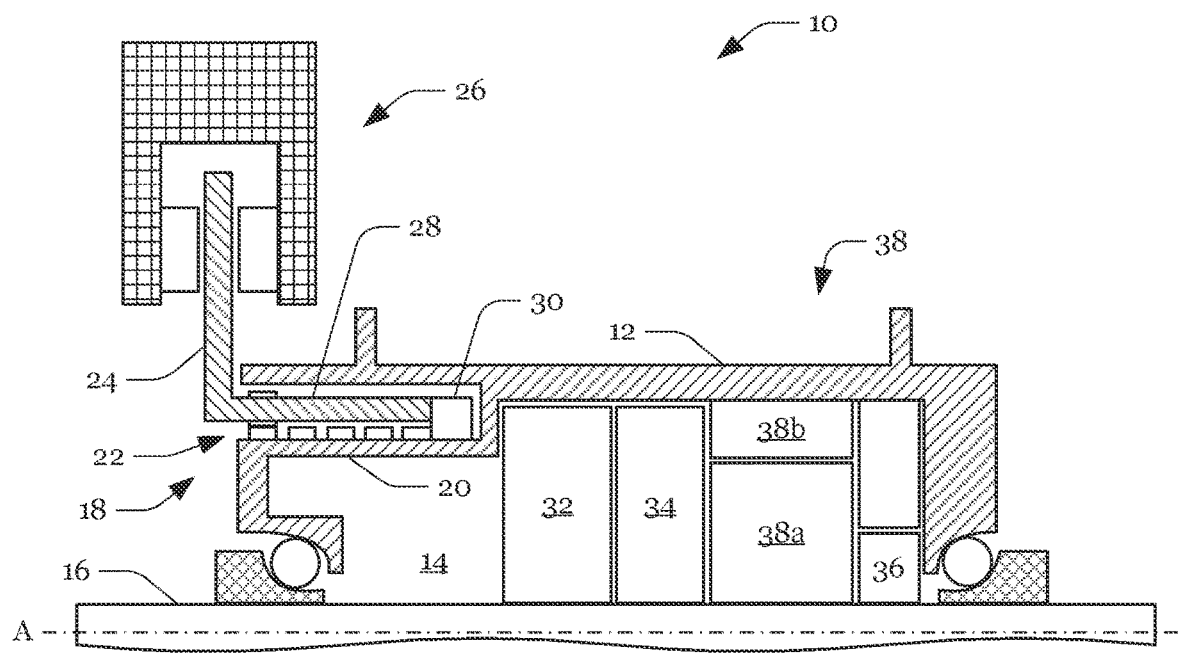
FIG. 2 illustrates a modification of the anti-lock braking system shown in FIG. 1.

FIG. 2 shows a modified anti-lock braking system 10 where controller 32 and inertial measurement unit 34 are integrated into hub 12 and mounted on axle 16. Controller 32 is configured to determine, based on measurements of inertial measurement unit 34 (which measures a yaw rate of the vehicle) and angular rate sensor 36 (which measures an angular rate of hub 12 around axis A) whether the braking force exerted on hub 12 is to be reduced to prevent a wheel comprising hub 12 from locking up. If controller 32 determines that the braking force exerted on hub 12 is to be reduced, controller 32 activates actuator 30 to (temporarily) disengage first part 20 and second part 22. Controller 32 is further configured to monitor a response of the vehicle to the activation of the actuator 30 and adjust an operation of the clutch (i.e., decrease or increase a friction between first part 20 and second part 22) as deemed necessary or beneficial for stabilizing a motion of the vehicle. Once the motion of the vehicle has been stabilized, controller 32 may deactivate actuator 32. This may cause first part 20 and second part 22 to (re-)engage.

The electric energy required by actuator 30, controller 32, inertial measurement unit 34, and angular rate sensor 36 is provided by generator 38. Generator 38 comprises first portion 38a which is substantially static relative to axle 16 and second portion 38b which is substantially static relative to hub 12, wherein the power output of generator 38 is comprised in first part 38a. If the vehicle comprises a lighting, generator 38 may also provide electric energy to the lighting. Anti-lock braking system 10 further comprises an energy storage (which may be integrated in the first part 38a of generator 38 or controller 32) and the electric devices may be supplied with electric energy from the energy storage. The energy storage may be used to continuously power a subset of the electric devices (such as the lighting) or as a backup energy source if (another part of) generator 38 fails. Alternatively, all power generated by the (other parts of) generator 38 may be supplied to the energy storage which may then provide the energy to power (all) the electric devices of the vehicle.

Figure 3:
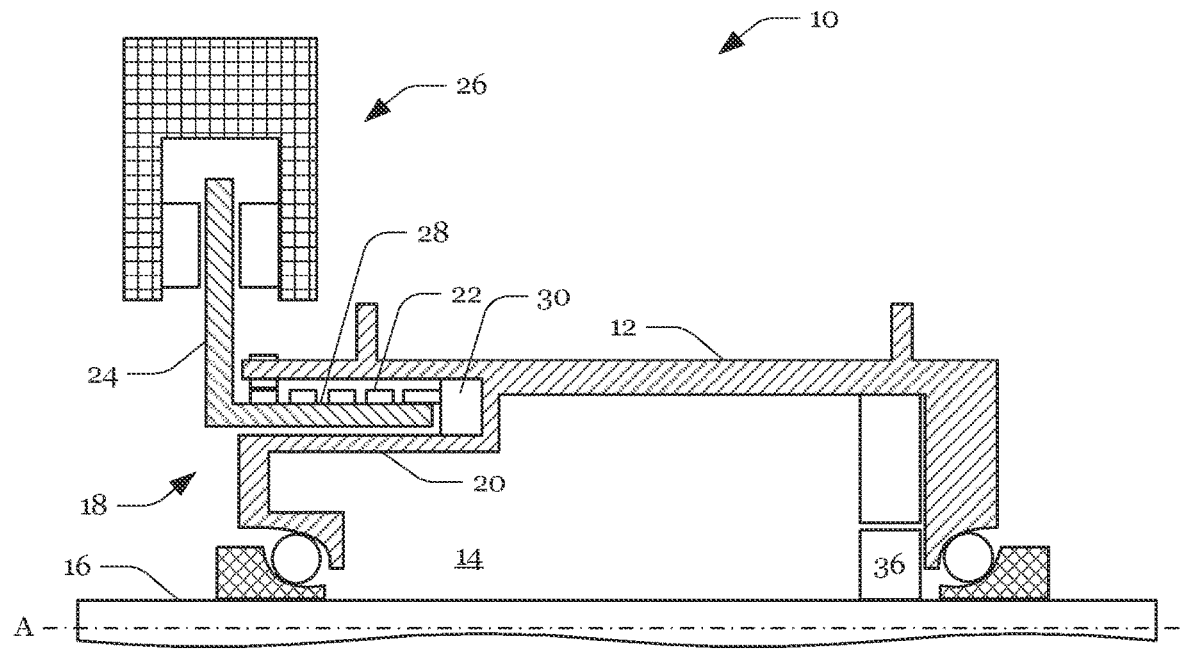
FIG. 3 illustrates an anti-lock braking system for a vehicle according to a second example.
Figure 4:
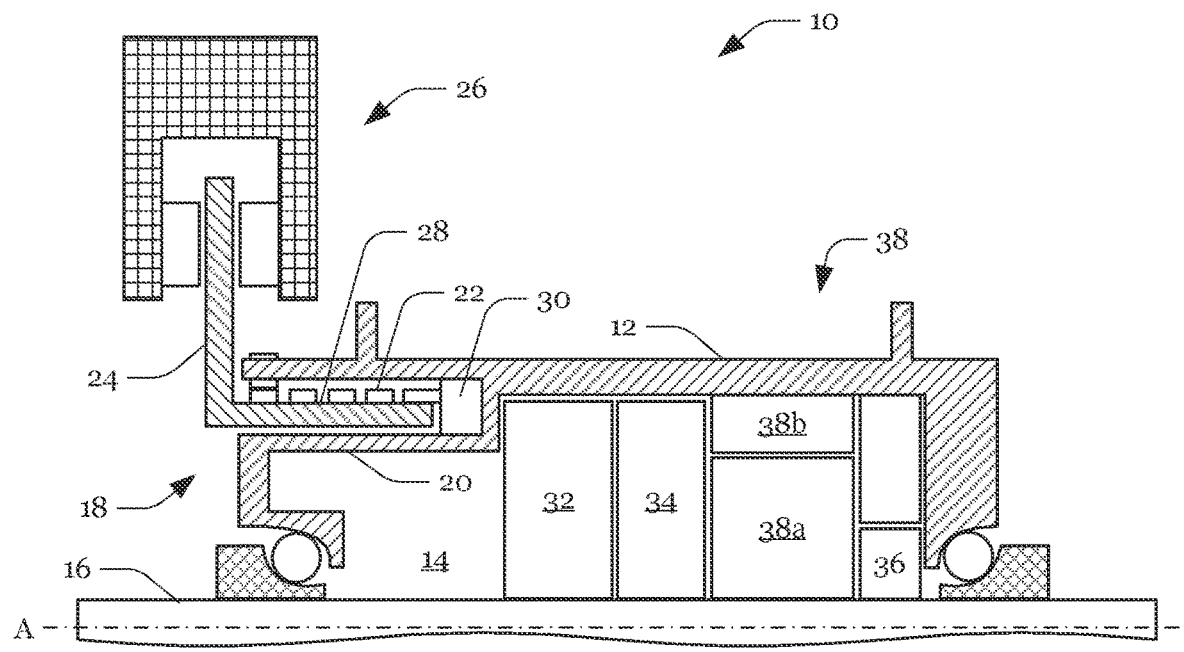
FIG. 4 illustrates a modification of the anti-lock braking system shown in FIG. 3.

FIG. 3 illustrates an anti-lock braking system 10 for a vehicle which differs from the anti-lock braking system 10 shown in FIG. 1 in that the first part 20 extends helically around axle 12 and in that the second part 22 comprises the cylindrical portion 28, wherein the disc 24 is integrally formed with the cylindrical portion 28. As illustrated by FIG. 4, the same modifications that may be made to the anti-lock braking system 10 of FIG. 1 (as illustrated by FIG. 2) may also be applied to the anti-lock braking system 10 of FIG. 3.

Figure 5:
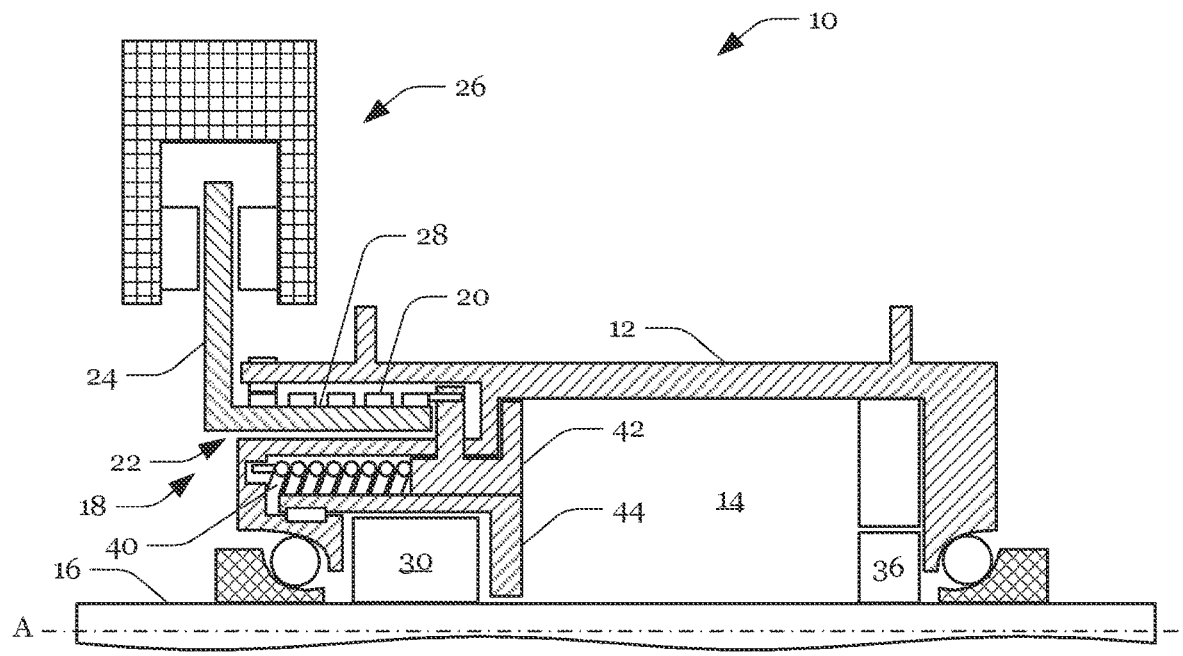
FIG. 5 illustrates an anti-lock braking system for a vehicle according to a third example.

FIG. 5 illustrates an anti-lock braking system 10 which differs from the anti-lock braking system 10 shown in FIG. 3 in that the anti-lock braking system 10 shown in FIG. 5 comprises torsion spring 40 which causes first part 20 and second part 22 to engage when actuator 30 is deactivated. Torsion spring 40 is connected to first part 20 by first element 42. When actuator 30 (which may comprise an electromagnet) is activated, second element 44 (which may comprise a magnetic material) is moved parallel to axis A towards actuator 30. As second element 44 is connected to hub 12 by a linear bearing, second element 44 will not rotate around axis A as a result of an increase or decrease in the rotational speed of hub 12.

Second element 44 is connected to first element 42 by a mechanism which causes first element 42 to rotate relative to hub 12 around axis A when second element 44 is moved parallel to said axis. For example, second element 44 may comprise an outer thread which engages with an inner thread of first element 42 such that an axial movement of second element 44 is translated into a rotational movement of first element 42. As first element 42 is connected with an end of first part 20 (with the other end of first part 20 being attached to hub 12), a rotational movement of first element 42 may increase or decrease a tension to which first part 20 is subjected.

If the rotational movement of first element 42 (caused by actuator 30) decreases the tension to which first part 20 is subjected, the force of friction between first part 20 and second part 22 decreases. If the rotational movement of first element 42 (caused by actuator 30) increases the tension to which first part 20 is subjected, the force of friction between first part 20 and second part 22 increases. Accordingly, the transmission of the braking force from disc brake 26 to the hub 12 can be controlled by positioning second element 44 through actuator 30.

Figure 6:
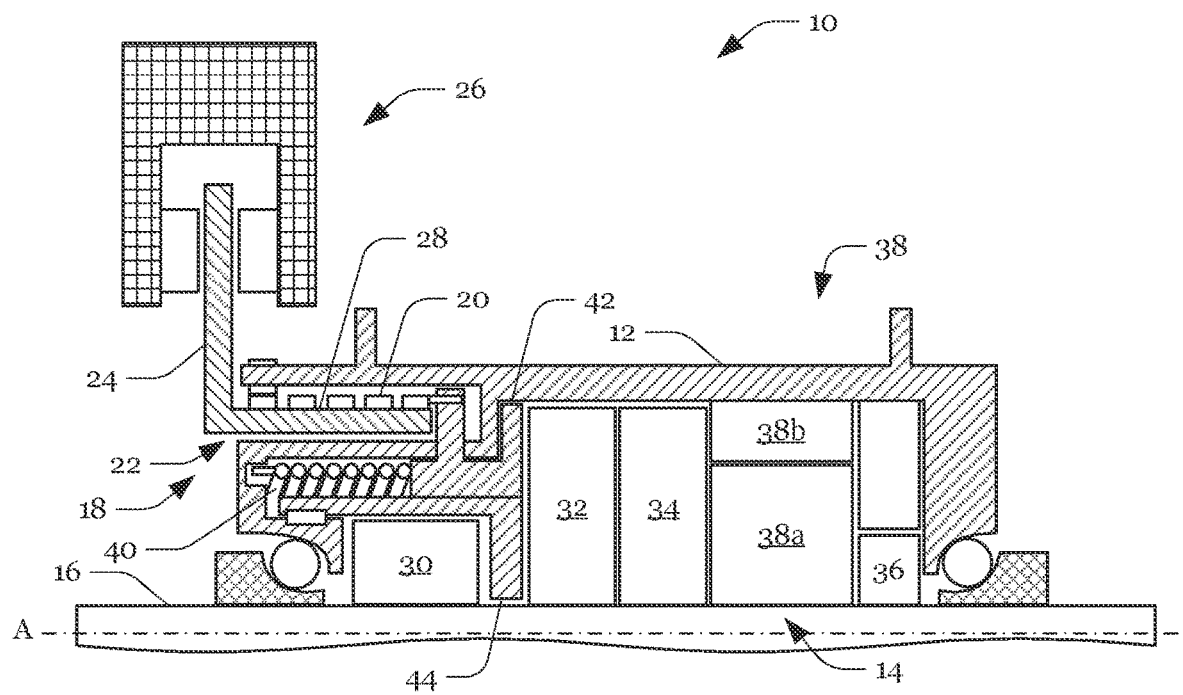
FIG. 6 illustrates a modification of the anti-lock braking system shown in FIG. 5.

As illustrated by FIG. 6, the same modifications that may be made to the anti-lock braking system 10 of FIG. 3 (as illustrated by FIG. 4) may also be applied to the anti-lock braking system 10 of FIG. 5.

Figure 7:
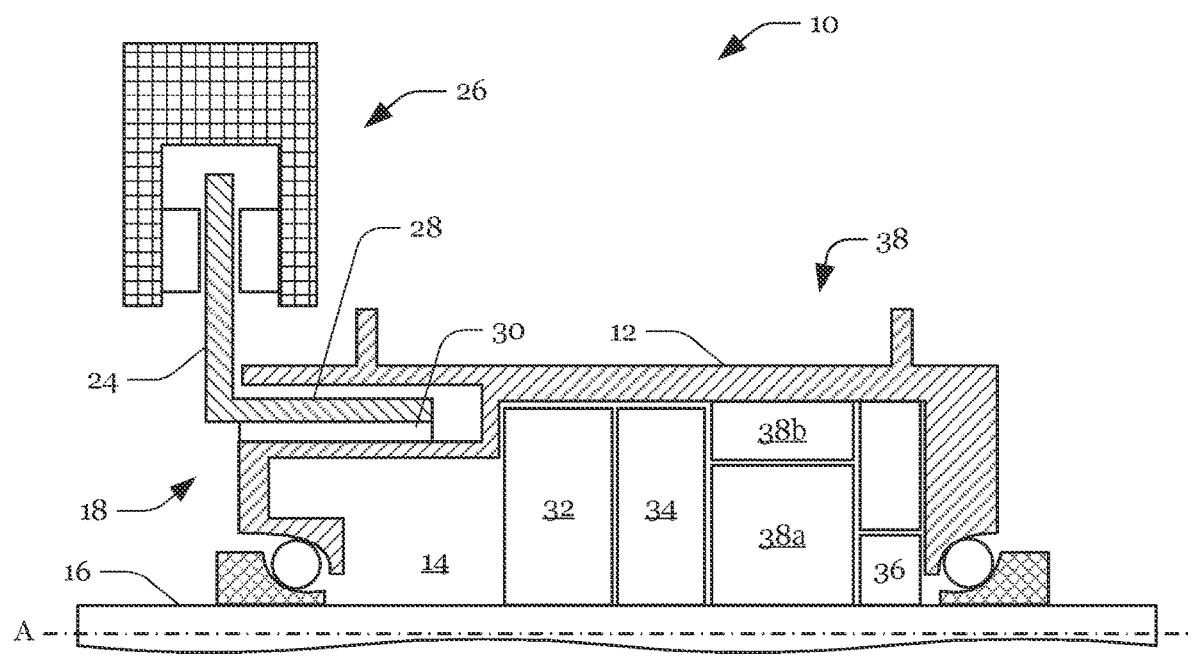
FIG. 7 illustrates an anti-lock braking system for a vehicle according to a fourth example.

As a further modification, actuator 30, controller 32, and inertial measurement unit 34 may not be static relative to axle 16 (as shown in FIG. 4, FIG. 5, and FIG. 6) but static relative to hub 12. Likewise, first portion 38a of generator 38 may be static relative to hub 12 and second portion 38b of generator 38 may be static relative to axle 16 which may facilitate the provision of electric energy to those electric devices that are static to hub 12. FIG. 7 illustrates an anti-lock braking system 10 which differs from the anti-lock braking systems 10 shown in FIGS. 1 to 6 in that neither the first part 20 nor the second part 22 extend helically around the axle 16. However, the anti-lock braking system 10 shown in FIG. 7 is similar to the anti-lock braking systems 10 shown in FIGS. 2, 4, and 6 in that the anti-lock braking system 10 shown in FIG. 7 comprises controller 32 and inertial measurement unit 34 which are mounted on axle 16.

In addition, although the detailed description has featured anti-lock braking systems 10 where a disc 24 of a disc brake 26 could be temporarily disconnected from the hub 12, it is also contemplated to apply a braking force onto the hub 12 by closing the clutch instead of transmitting the breaking force through the closed clutch.

Figure 8:
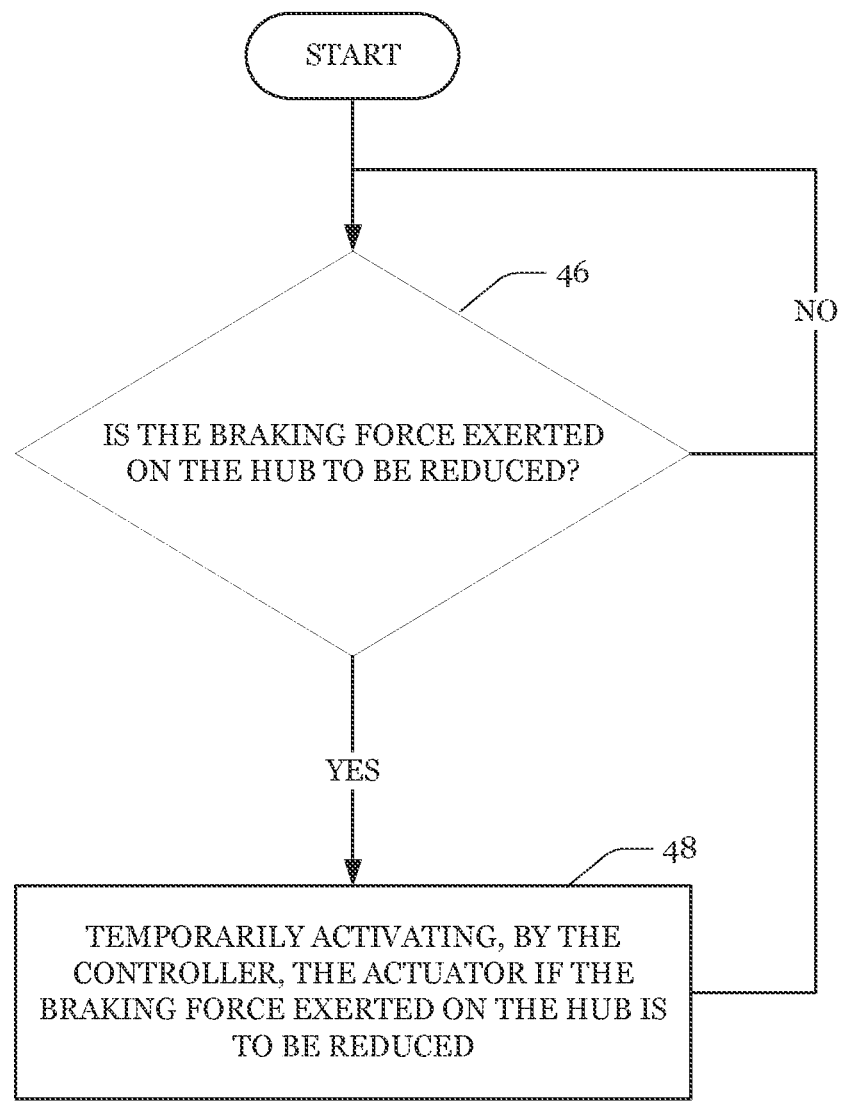
FIG. 8 shows a flow chart of a method of operating the anti-lock braking systems shown in FIG. 1 to FIG. 7.

FIG. 8 shows a method of operating an anti-lock braking system 10. The method starts at block 46 with determining, by controller 32, whether the braking force exerted on hub 12 is to be reduced. If it is determined that the braking force exerted on hub 12 is to be reduced, the controller 32 activates actuator 30 at step 48. If it is determined that the braking force exerted on hub 12 is not (or no longer) to be reduced, the method loops back to block 46.

REFERENCE SIGNS LIST 10 anti-lock braking system
12 hub
14 cavity
16 axle
18 device
20 first part
22 second part
24 disc
26 disc brake
28 cylindrical portion
30 actuator
32 controller
34 inertial measurement unit
36 angular rate sensor
38 generator
38a first portion
38b second portion
40 torsion spring
42 first element
44 second element
46 step
48 step

What is claimed is:

1. An anti-lock braking system for a vehicle, comprising:
a hub having a hollow cavity that accommodates an axle, the hub being rotatable about the axle;
a device having a first part that rotates concurrently with the hub and a second part which may rotate relative to the hub when the first part and the second part are disengaged; and
an actuator which is configured to control a transmission of a braking force from a frame of the vehicle to the hub by actuating the device;
wherein
one of the first part or the second part extends helically around the axle along a length of the axle.

2. The anti-lock braking system of claim 1, further comprising:
a disc brake that is spaced apart from the first part;
a disc on which the disc brake operates;
wherein the first part extends helically around the axle;
wherein the second part comprises a cylindrical portion; and
wherein the disc is connected to, attached to, or integrally formed with, said cylindrical portion.

3. The anti-lock braking system of claim 2, further comprising:
a first element;
a second element; and
a torsion spring;
wherein the torsion spring is connected to the first part by the first element;
wherein the second element is movable by the actuator; and
wherein the second element causes the first element to rotate relative to the hub around the axle when the second element is moved parallel to a longitudinal axis (A) of the axle.

4. The anti-lock braking system of claim 3,
wherein the second element comprises a magnetic material and the actuator is configured to generate a magnetic field when activated; and/or
wherein the actuator comprises an electromagnet which is static relative to the axle.

5. The anti-lock braking system of claim 1, further comprising:
an inertial measurement unit, wherein the inertial measurement unit is mounted on the axle.

6. The anti-lock braking system of claim 5, wherein the inertial measurement unit is configured to measure a yaw rate of the vehicle.

7. The anti-lock braking system of claim 5, further comprising:
an angular rate sensor, wherein the angular rate sensor is configured to measure an angular rate of the hub.

8. The anti-lock braking system of claim 5, further comprising:
a controller;
wherein the controller is mounted on the axle;
wherein the controller is configured to determine, based on measurements of the inertial measurement unit and/or the angular rate sensor whether the braking force exerted on the hub is to be reduced to prevent a wheel comprising the hub from locking up; and
wherein the controller is further configured to reduce the braking force exerted on the hub by activating the actuator.

9. The anti-lock braking system of claim 1, further comprising:
a generator;
wherein the generator comprises a first portion which is static relative to the axle and a second portion which is static relative to the hub; and
wherein the first portion has a power output.

10. The anti-lock braking system of claim 9, further comprising:
a lighting, wherein the generator is configured to provide electric energy to power the lighting through the power output.

11. The anti-lock braking system of claim 1, further comprising:
a torsion spring;
wherein the torsion spring is configured to cause the first part and the second part to engage when the actuator is deactivated.

12. The anti-lock braking system of claim 1, wherein the device is a band clutch.

13. The anti-lock braking system of claim 1, wherein the device is a wrap spring clutch.

14. The anti-lock braking system of claim 1, further comprising:
a disc brake that is spaced apart from the first part;
a disc on which the disc brake operates;
wherein the second part extends helically around the axle; and
wherein the disc is connected to, attached to, or integrally formed with, said second part.

15. The anti-lock braking system of claim 1, wherein the vehicle is a single-track vehicle.

* * * * *